UNITED STATES PATENT OFFICE.

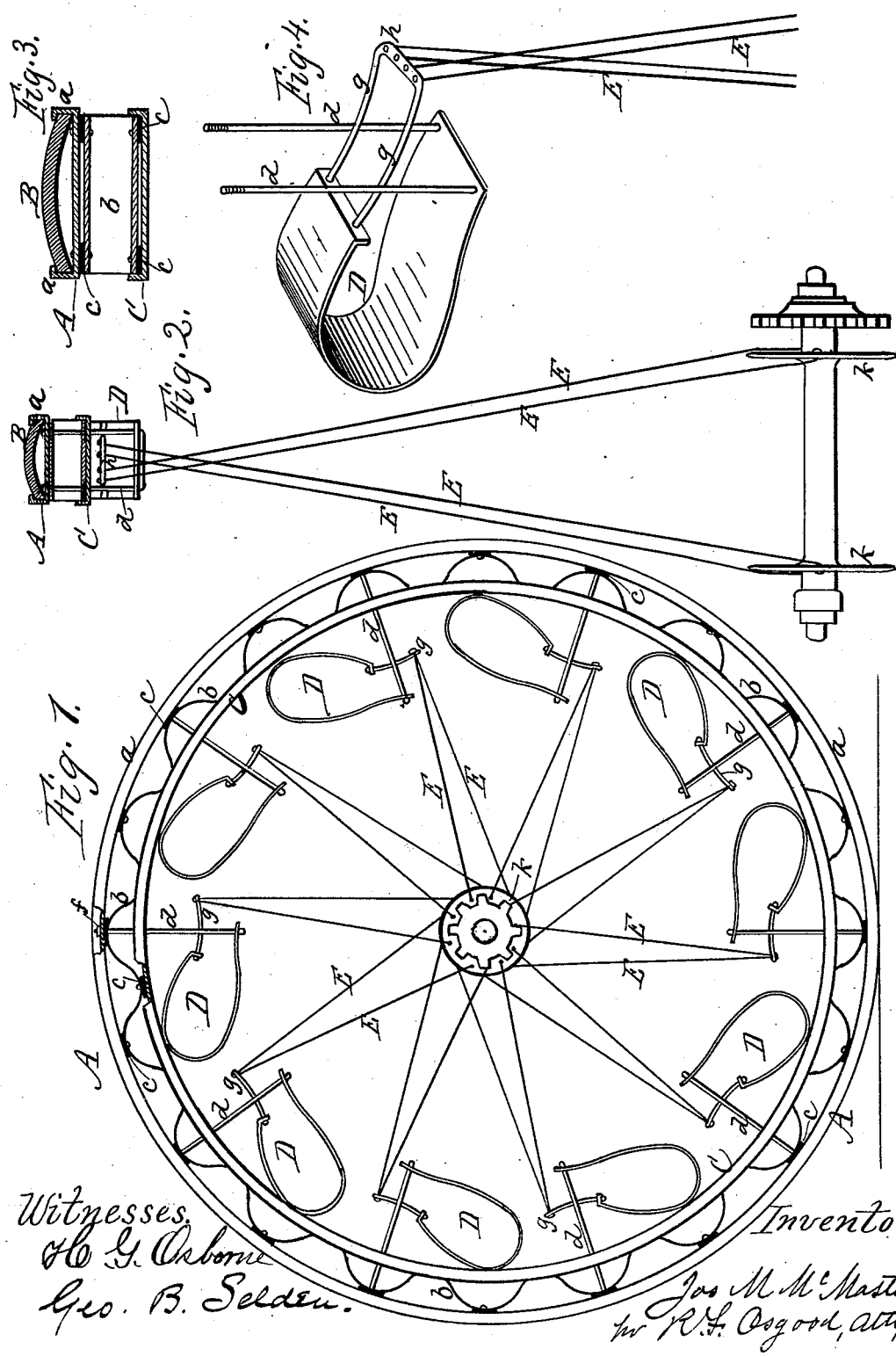

JOSEPH M. McMASTER, OF ROCHESTER, NEW YORK.

WHEEL.

SPECIFICATION forming part of Letters Patent No. 521,570, dated June 19, 1894.

Application filed November 21, 1893. Serial No. 491,586. (No model.)

*To all whom it may concern:*

Be it known that I, JOSEPH M. MCMASTER, of Rochester, in the county of Monroe and State of New York, have invented a certain new and useful Improvement in Wheels; and I do hereby declare that the following is a full, clear, and exact description of the same, reference being had to the drawings accompanying this application.

My improvement relates to wheels, and is applicable particularly to bicycle wheels, and the design is to substitute for the rubber and pneumatic tire and other rigid wheels now in use, a wheel in which a set of springs is rigidly attached inside a stiff rim, within which is hung a hub by suitable means, preferably wires, attached to said springs, producing a swinging spring action and relieving, by distributing the shock, from any irregular resistance or in passing over irregular surfaces.

The invention consists in the construction and arrangement hereinafter described and embodied in the claims.

In the drawings—Figure 1 is a side elevation of the wheel. Fig. 2 is a cross section of the upper half of the same. Fig. 3 is an enlarged vertical, cross section through the two rims of the wheel. Fig. 4 is a perspective view of one of the springs.

Ordinary wheels are made rigid, either by stiff spokes, or tension wires drawn taut, so as to hold the hub rigidly at the center of the rim. This construction makes the wheel stiff and unyielding and has its inconveniences, as the whole weight of the wheel and load is concentrated at the point of contact of the wheel resistance, a blow at any point jarring the whole. A series of such blows or concussions in passing over irregular surfaces is inconvenient and unpleasant to the rider and soon wears out the wheel. Various means have been employed to obviate these difficulties. A rubber tire modifies but does not destroy the jar. I obviate these difficulties by suspending the hub or axle from the top of the rim by means of springs so that the action is similar to that of a hammock, and I therefore denominate it a "hammock" wheel. By means of these springs the weight of the load is at all times hung from the upper half of the rim of the wheel instead of being concentrated at the point of contact of the tire with the ground or other resistance, and the concussion being transferred to the upper part of the rim, then through several springs to the hub and load, is divided and equalized. The load thus hanging from the top of the wheel enables the wheel to be turned with the greatest ease and least possible resistance.

The wheel is constructed as follows:—A is the rim, the edges *a a* being turned up in U form and then turned inward, forming a seat in which is fitted a rubber or other elastic tire B, a little wider than the seat so as to take a crowning shape when forced in place, the center standing a little higher than the rim. The rim is made of thin metal, preferably steel, and the upturned edges give it great stiffness, so that in ordinary use it retains its circular form at all times. But for heavy work it may be reinforced by a second interior rim C, having also up-turned edges, said interior rim separated from the outer one by a suitable space, and the two securely connected by braces *b b* which may be of any suitable kind. As shown in the drawings the braces consist of a strip of metal bent in corrugated form and fastened alternately to the two rims by rivets. This forms what I denominate a "lattice rim." In order to deaden the ringing sound that would otherwise be produced, packings *c c* of leather, or other non-resonant material, are placed between the braces and the rims at the points of contact, as shown in Fig. 1. These packings effectually prevent noise.

D D are a set of springs connected at regular intervals apart with the inside of the rim of the wheel. Said springs may consist of flat plates recurved to form arches, and attached at the front by guards *d d* which extend up through holes in the rim and are secured to the upper rim by nuts *f f*, by which the tension of the springs may be increased. To the flat springs are attached spring arms *g g*, extending outward through or between the guides, and projecting a sufficient distance for the attachment of the tension wires, the outer ends of the spring arms being connected by a cross piece *h* standing crosswise of the wheel, said cross piece being flattened and pierced with four holes to receive the ends of the tension wires attaching said springs to the hub. The holes all stand in line crosswise of the wheel. The spring arms have free movement to and from the rim in the plane of the wheel, but are held by the guards against lateral or cross movement.

E E are the tension wires, attached, at one end to the cross pieces $h$ of the springs and at the other to the side flanges $k\,k$ of the hub. These wires are attached to the springs in pairs, each pair connecting with opposite ends of the hub, and each alternate pair with opposite sides of the hub. Two pairs are preferably attached to one spring. Two of these pairs of wires, connected with the cross pieces $h$ of the spring arms in a line crosswise of the wheel, hold the cross pieces at a uniform distance from the hub both back and front and sidewise. The wires by their peculiar connection are bracing, and being attached to spring arms resting between the guards they prevent any lateral motion of the rim relative to the hub. At the same time they allow the hub to move freely to and from the rim in the plane of the wheel as the pressure changes and different tension is exercised by the springs. The hub and load are thus securely held until the wires slacken, and this is provided against in the manufacture by giving the springs greater tension than the load can overcome.

The operation is such that the strain on the lower half of the wheel is relieved, where also is the contact with the resistance, and the load by means of the upper springs swings from the upper half of the rim as in a hammock. As the wheel rolls the spring going down is relieved and the spring coming up gradually takes the strain, and thus the load moves at all times as in a swing, while the arched elastic tire on the outside of the rim prevents noise and undue wear and does not slip as easily as the round tire, still less easily than the pneumatic tire, and the rim having the U shape the edges prevent the cutting of the elastic tire on stones, &c., and so enable the wheel to be used on carriages with great facility and economy.

Having described my invention I do not claim broadly two rims; neither do I claim two rims with springs between them and outside the inner rim; neither do I claim two rims connected by bracing.

What I claim as new, and desire to secure by Letters Patent, is—

1. In a wheel, the combination, with a stiff rim capable of maintaining its circular form under the load to which it is subjected, of tension springs attached to the inside of the rim and tension wires connecting the springs with the hub, the springs and wire being made independent of each other, but attached together by joints that allow free action, the whole so arranged that, when the hub is depressed, tension is produced on the top springs, the bottom springs are relaxed, and a free joint action is produced between the hub and springs, as herein shown and described.

2. The combination, in a wheel, of two rims suitably braced together, a set of springs attached to the inner side of the inner rim, and connections between the springs and hub, whereby when the hub is depressed tension is produced on the top springs and the bottom springs are relaxed, as specified.

3. A wheel provided with two rims one inside the other and separated by an intervening space, braces connecting the rims, and packings of non-resonant material between the braces and rims at the points of contact, as and for the purpose specified.

4. In a wheel the combination of a stiff rim, springs attached thereto, and tension wires attached to the springs extending to opposite ends of the hub, in the manner and for the purpose specified.

5. The combination, with a stiff rim, of guides attached thereto, springs passing between the guides and held by same against lateral motion, a hub, and connections attached at one end to the hub and at the other to the springs outside of the guides, as and for the purpose specified.

In witness whereof I have hereunto signed my name in the presence of two subscribing witnesses.

JOSEPH M. McMASTER.

Witnesses:
R. F. OSGOOD,
P. H. COSTICH.